Apr. 17, 1923.  
T. M. HOWE  
OPHTHALMIC MOUNTING  
Filed Aug. 4, 1922
1,451,696
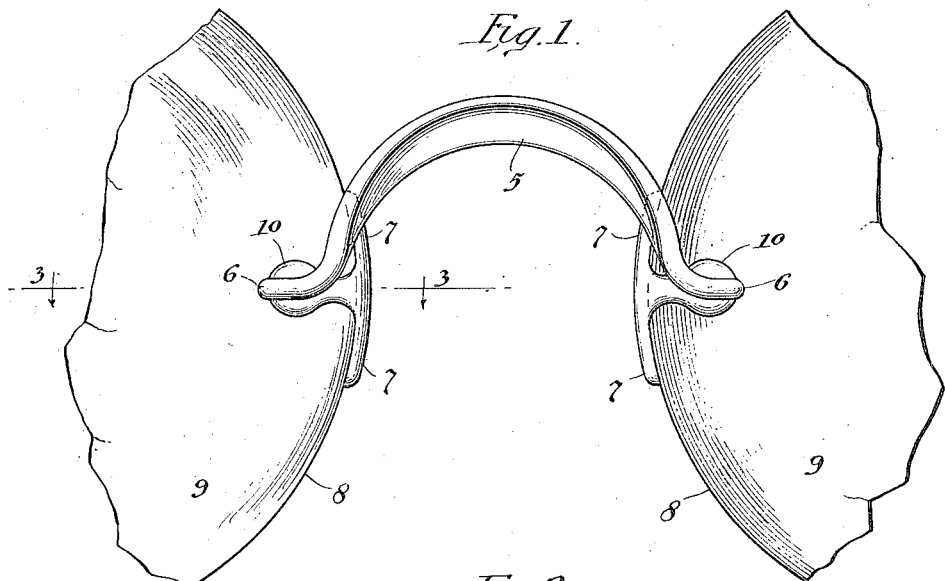
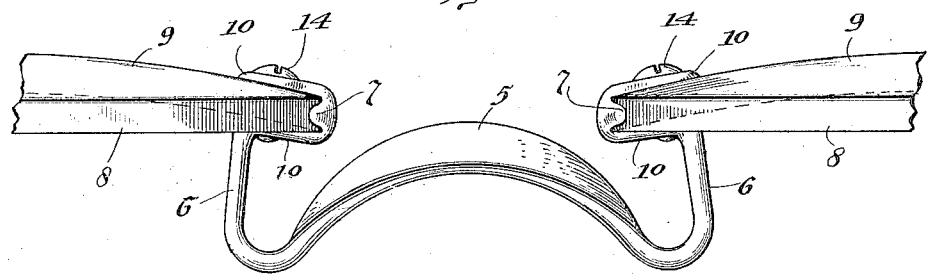
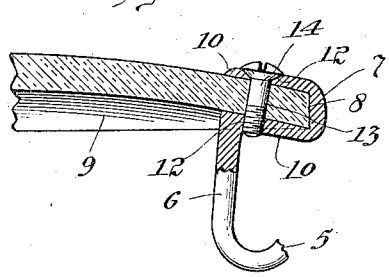
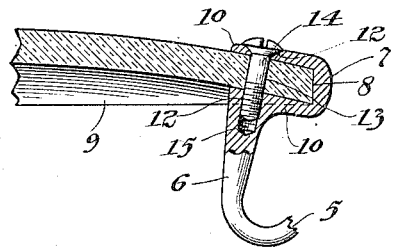
Inventor:
Thomas M. Howe
by Benjamin, Woodhouse & Lundy
Attys Patented Apr. 17, 1923.

UNITED STATES PATENT OFFICE.

THOMAS MITCHELL HOWE, OF LOUISVILLE, KENTUCKY, ASSIGNOR TO F. A. HARDY & COMPANY, OF CHICAGO, ILLINOIS, A CORPORATION OF ILLINOIS.

OPHTHALMIC MOUNTING.

Application filed August 4, 1922. Serial No. 579,608.

*To all whom it may concern:*

Be it known that I, THOMAS M. HOWE, a citizen of the United States, residing at Louisville, in the county of Jefferson and State of Kentucky, have invented a new and useful Improvement in Ophthalmic Mountings, of which the following is a specification.

My present invention relates to ophthalmic mountings or mountings for spectacle and eye-glass lenses, and has special reference to a combination of bridge and lens clamps for such mountings, it being understood that the bridge is the portion of the structure which extends over and bridges the nose, and to the ends or shanks of which the lens clamps are attached. The lens clamps are the portions of the structure which secure the lenses in position and ordinarily comprises a segmental piece, which extends along the periphery of the lens, and an ear or ears which extend laterally from the segmental piece and are bent at right angles thereto so as to lie against one or both faces of the lens, a screw or stud being inserted through a bore provided in the lens and screwed into a tapped hole provided in an ear for holding the lens against and in assembly with the segmental piece and against the ear or between the ears, as the case may be. Heretofore, so far as I am aware, it has been the unvarying practice to attach the ends or shanks of the bridge to the segmental piece of the lens clamps between or at the points where the bases of the lens ear or ears joins therewith.

I prefer to make a right angle juncture between the ends or shanks of the bridge and an ear of the lens clamps at a point sufficiently remote from the base of the ear to come opposite the face or within the periphery of the lens. This construction permits of securing a narrower pupilary distance with a given bridge. It also facilitates and effects an economy in the manufacture of a bridge and clamps by a stamping operation from an integral piece of metal, thereby doing away with the necessity of employing solder. It facilitates adjustment when deeply curved lenses are employed, and it also lessens the torque by placing the point of support nearer to the center of the lens, and when, as shown in the modified form, with the bridge shank placed so as to receive the screw or stud, it secures greater rigidity and lessens the liability of working loose. I attain the beforementioned results by means of the structure illustrated in the accompanying drawing, in which—

Fig. 1 is a rear fragmental elevation of a pair of spectacle lenses in combination with my improved arrangement of bridge and lens clamps.

Fig. 2 is a top plan of the structure shown in Fig. 1.

Fig. 3 is a section on line 3—3, Fig. 1, and

Fig. 4 is a section similar to Fig. 3 showing a modified form of construction in which the bridge shank is positioned so as to receive the screw or stud.

Similar reference characters have been employed to designate similar parts throughout the several views.

The bridge illustrated in the drawing is of the type usually employed with spectacles, but the principles of my invention may be incorporated with eye-glass bridges as well. The bridge shown consists of a central longitudinally curved portion 5 which is broadened to more comfortably rest upon the nose and which may be angled or sloped to conform to the contour of the nose for which it is being adjusted in accordance with the usual practice. At the ends of the widened central portion the bridge is given a substantially round section and bent or curved forwardly to provide the bridge ends or shanks 6, 6.

The lens clamps employed and shown by me are preferably of standard construction and consist of a strap 7 adapted to lie along the edge or periphery 8, of a lens 9, from either edge of which strap at the central portion extends the lens ear or ears 10, 10, which are bent in planes at substantially right angles to the plane of the peripheral strap 7, at the location at which they are attached so as to bring the ears upon opposite faces of the lens. Both lens ears are perforated, as at 12, 12, and the perforations in the rear ear, or that nearest the face of the wearer, is tapped. The lens also is bored, as at 13, so as to register with the perforations 12 in the ears when the lens is properly assembled with the lens clamp and a headed screw 14 is passed through the perforation in the front lens ear, the bore in the lens and is screwed into the tapped perforations in the rear lens ear.

As heretofore explained, it has heretofore been the unvarying practice to attach the bridge shank to the peripheral strap 7 at or between its place of juncture with the lens ears. I, however, connect the end of bridge shank 6 with the inner lens ear 10 at a point sufficiently remote from its base or juncture with the peripheral strap 7 so that the point of juncture between the bridge shank and the lens ear is well within the line of the periphery of the lens. For clearness, I have illustrated this point of juncture at the end of the lens strap farthest from its base or point of juncture with the peripheral strap. The point of attachment in any particular case will depend upon the size and nature of the lenses and the shortness of pupillary distance or separation which it is desired to attain.

In the modified construction, shown in Fig. 4, I have shown the place of juncture between the bridge shank and the lens ear as located directly over perforation 12 in the lens ear so that the shank alines with the axis of screw 14, and in such a construction it is deemed preferably to bore and tap a portion of the bridge shank, as at 15, so as to provide a greater amount of threading to receive headed screw 14. This provides a more rigid construction and tends to prevent the loosening of the screw during wear which is not an infrequent occurrence.

It will now be seen from the foregoing description, taken in connection with the drawing, that I have provided an organization of bridge and lens clamps for spectacles and eye-glass mountings which affords various facilities in manufacture and adjustment and produces a structure of improved appearance and operation.

What I claim is:

1. In ophthalmic mountings the combination of a lens clamp comprising a peripheral strap, lens ears extending in parallel relation from said strap with a bridge connecting at its ends with a lens ear of said lens clamp, said lens ears being oppositely bored and said bore extending into the bridge at its point of attachment with the lens ear and being tapped therein, and a headed screw assemblying with the bores in said lens ears and screwing into the tapped bore in said bridge.

2. In ophthalmic mountings, means for receiving a lens including parallel ears engaging opposite faces of the lens, a clamping screw passing through said ears and lens, and a bridge having a shank in alinement with the axis of said screw.

3. In ophthalmic mountings, means for receiving a lens including a peripheral strap for receiving the edge of a lens and supporting the same against relative vertical movement between the lens and the mounting, parallel ears extending at right angles to the plane of the strap for engaging opposite faces of a lens and holding said lens to said strap and preventing a rotational movement about its horizontal axis, a clamping screw for passing through said ears and lens, and a bridge having shanks making juncture with the face of a lens ear inside of its periphery, whereby a large latitude for adjustment for pupillary distance is obtained with a reduction in extent and weight of metal and torsional strain.

Signed at Louisville, county of Jefferson and State of Kentucky, this 15th day of March, 1922.

THOMAS MITCHELL HOWE.

Witnesses:
ALBERTA ROBBINS,
T. J. HOWE.